July 10, 1934.  F. M. HARTFORD ET AL  1,965,832
TUNNEL KILN
Filed May 21, 1931   3 Sheets-Sheet 1
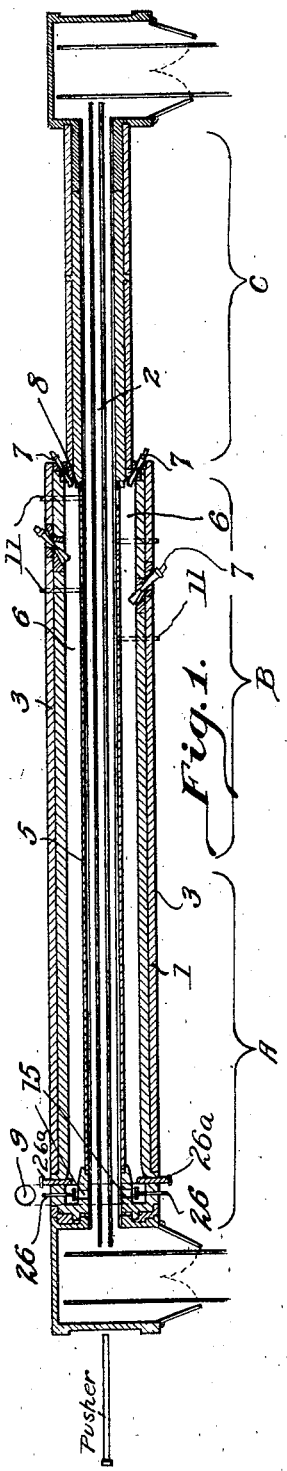
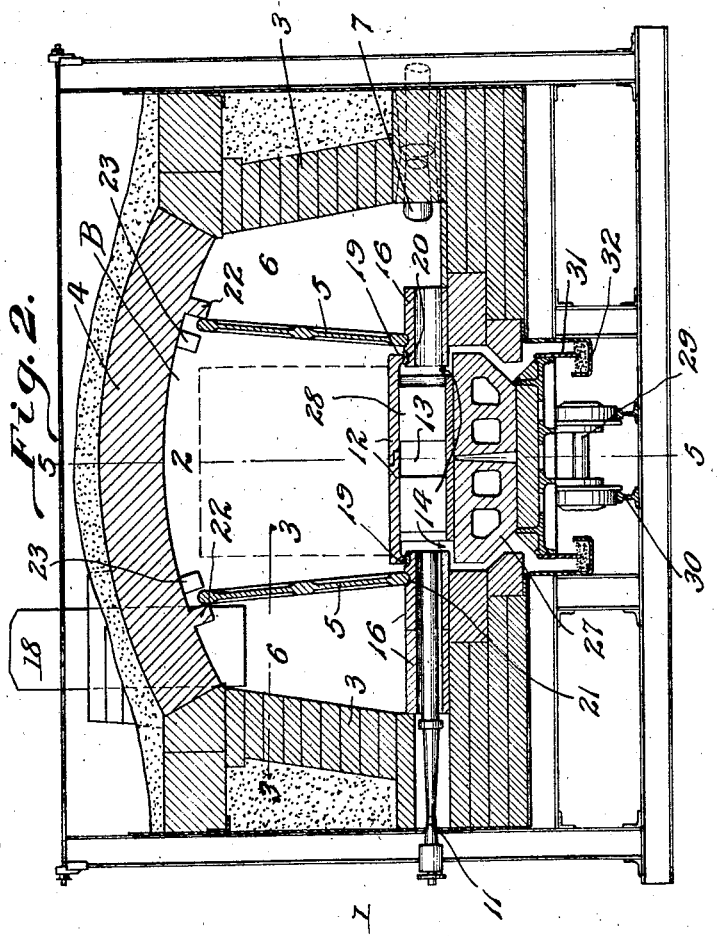
Inventor
F. M. Hartford
G. D. Brush
By
Attorney July 10, 1934.  F. M. HARTFORD ET AL  1,965,832
TUNNEL KILN
Filed May 21, 1931  3 Sheets-Sheet 2
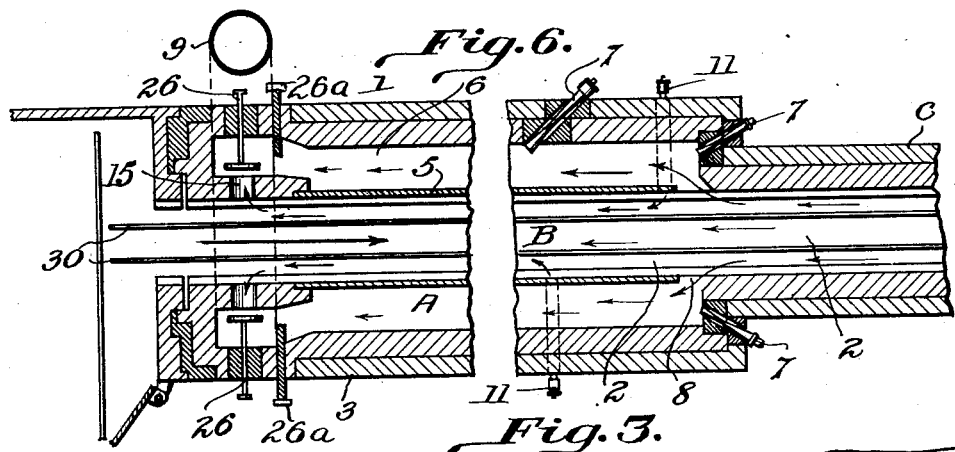
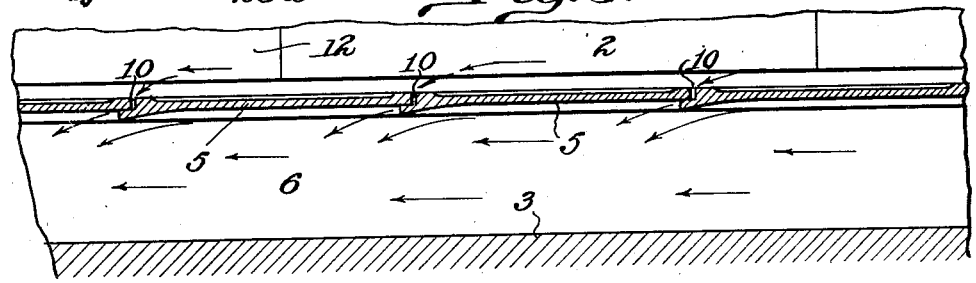
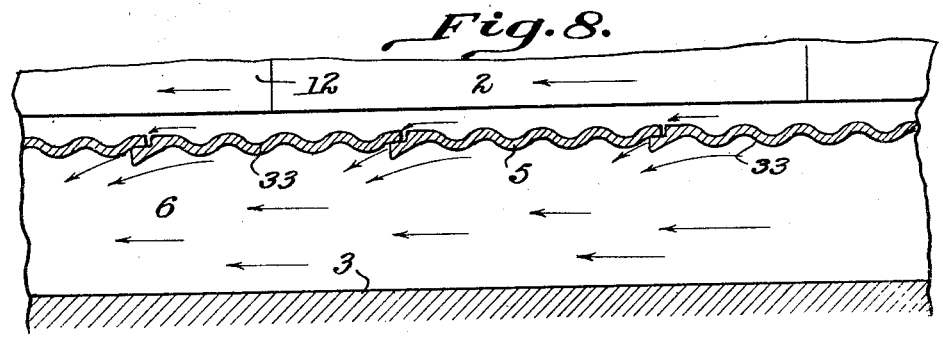
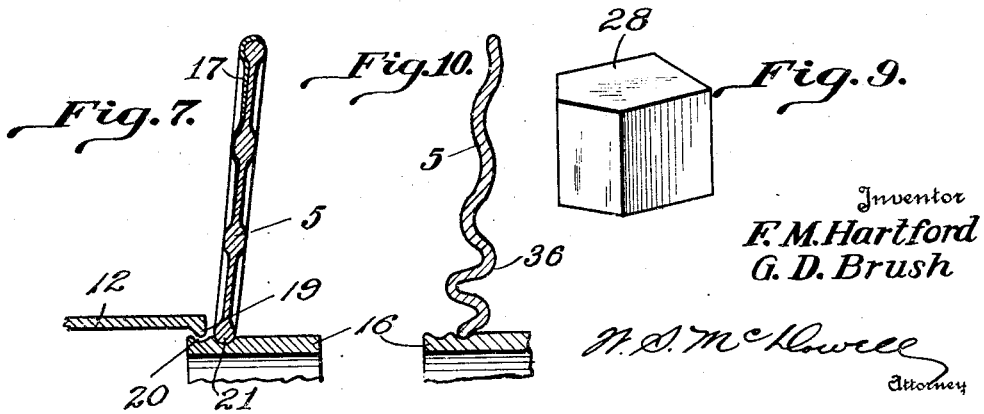
Inventor
F. M. Hartford
G. D. Brush
Attorney Patented July 10, 1934

1,965,832

UNITED STATES PATENT OFFICE 1,965,832

TUNNEL KILN

Frank M. Hartford and George D. Brush, Columbus, Ohio, assignors to Harrop Ceramic Service Company, Columbus, Ohio, a corporation of Ohio Application May 21, 1931, Serial No. 539,016

25 Claims. (Cl. 25—142)

This invention relates to improvements in tunnel kilns and has particular reference to tunnel kilns wherein the combustion gases, used in maintaining the operating temperatures of such kilns, may be substantially removed from direct contact with the ware undergoing heat treatment.

In the firing of certain ceramic products, it is sometimes desirable that the combustion gases, used in heating the kiln, be kept out of contact with the ware, at least to some extent. To this end it is an object of the present invention to provide a tunnel kiln wherein baffle plates are used to separate that part of the tunnel through which the ware passes from the spaces on each side of the tunnel or kiln where combustion takes place or through which the products of combustion travel towards the charging end of the kiln. The result of this construction is that the heating of the ware may be accomplished largely by radiation of heat from the surfaces of these baffle plates onto the ware and without any substantial direct contact of the gases with the ware.

In the indirect fired type of a continuous tunnel kiln, having a stationary fire zone and moving ware and in which the transfer of heat to the ware is effected largely by radiation, one of the outstanding objections thereto is found in the difficulty encountered in heating the lower central portion of the ware setting to as high a temperature as the outer and top portions of the setting. Especially is this true when the ware is being passed through such a kiln at a fairly rapid rate.

When such a system of heat transfer by radiation to the ware is employed, there often results a cross sectional area in the ware setting, around the lower central part thereof, which is usually at a lower temperature than the remainder of the setting. In order to obviate this area of lower temperature and more nearly heat the entire setting equally and uniformly, the present invention has for a further object to provide means for supplying a relatively smaller amount of heat to the under side of the car floor or platform, upon which the ware rests, and especially the center part of the car platform, whereby heating means is provided in the ware carrier itself to compensate for the normal deficiency in temperature in the lower center portion of the ware, requiring such supplemental heating, this heat deficiency being due largely to the draining and absorption of heat by the car platform and its body.

It is another object of the invention to provide supplemental burner devices for supplying heat to the space formed between the car platform, on which the ware setting is arranged, and the body of the car located below the platform, and wherein provision is made for heat sealing the longitudinal edges of the car platform or platforms in order that the products of combustion resulting from the supplemental burners will travel lengthwise of the kiln underneath the platform to the charging end of the kiln, or, optionally, such gases may pass transversely across the space beneath said platforms and enter the combustion gas spaces disposed back of the baffle plates on the opposite side of the tunnel for travel through such space to the charging end of the kiln, where the gases are drawn out through suitable draft ports.

It will, therefore, be apparent that if the central bottom portion of the setting can be heated as rapidly and uniformly as the sides and top of the ware setting, as the cars of ware proceed from the entrance end toward the high temperature section of the kiln, a faster firing schedule can be maintained, and, consequently, a greater production of uniformly fired ware produced by a kiln of given length, and it is to the attainment of these results and other related features that the present invention is directed.

With these and other objects in view, which will appear as the description proceeds, the invention consists in the novel features of construction, combination of elements and arrangements of parts hereinafter fully described and pointed out in the appended claims.

In the accompanying drawings:

Fig. 1 is a horizontal sectional view taken through a kiln constructed in accordance with the present invention;

Fig. 2 is a vertical transverse sectional view taken through the high-fire section of the kiln;

Fig. 3 is a detail horizontal sectional view taken through the baffle plates on the plane indicated by the line 3—3 of Fig. 2;

Fig. 6 is an enlarged horizontal sectional view taken through the kiln;

Fig. 7 is a detail sectional view of a modified form of baffle or shield plate;

Fig. 8 is a detail horizontal sectional view taken through a further modified form of shield plate formation;

Fig. 9 is a detail perspective view of one of the pier members.

Figure 10 is a vertical sectional view through a modified form of baffle plate provided with longitudinally extending corrugations.

Figure 4:
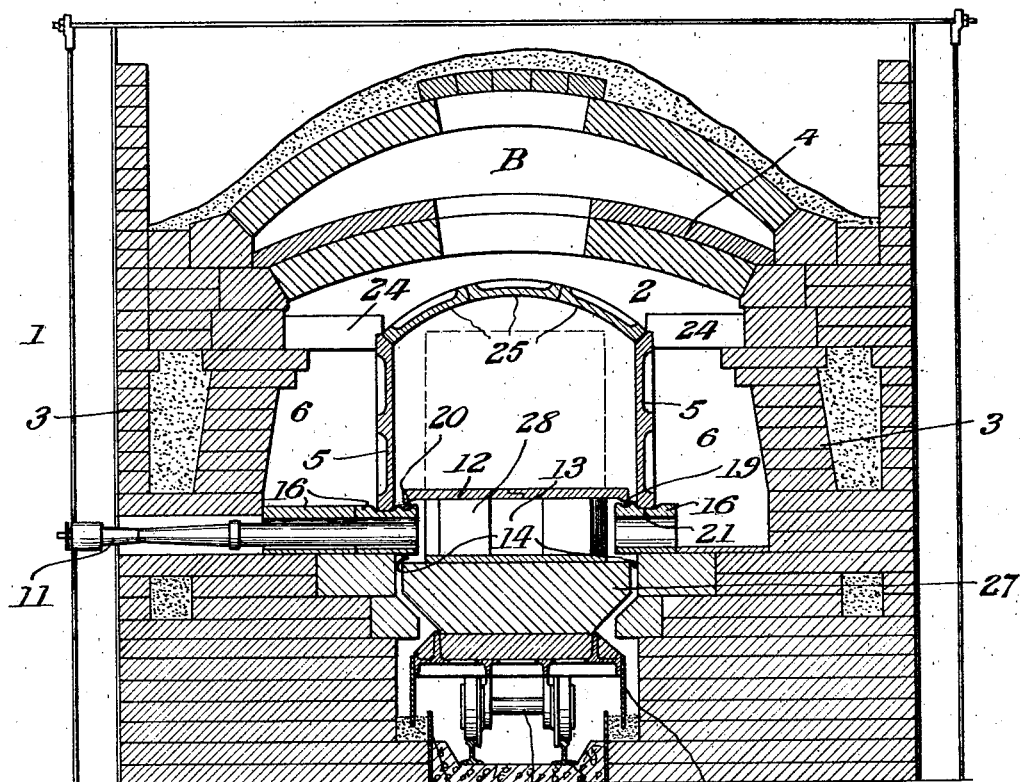
Fig. 4 is a vertical transverse sectional view taken through a slightly modified form of kiln embodying the features of the present invention.
Figure 5:
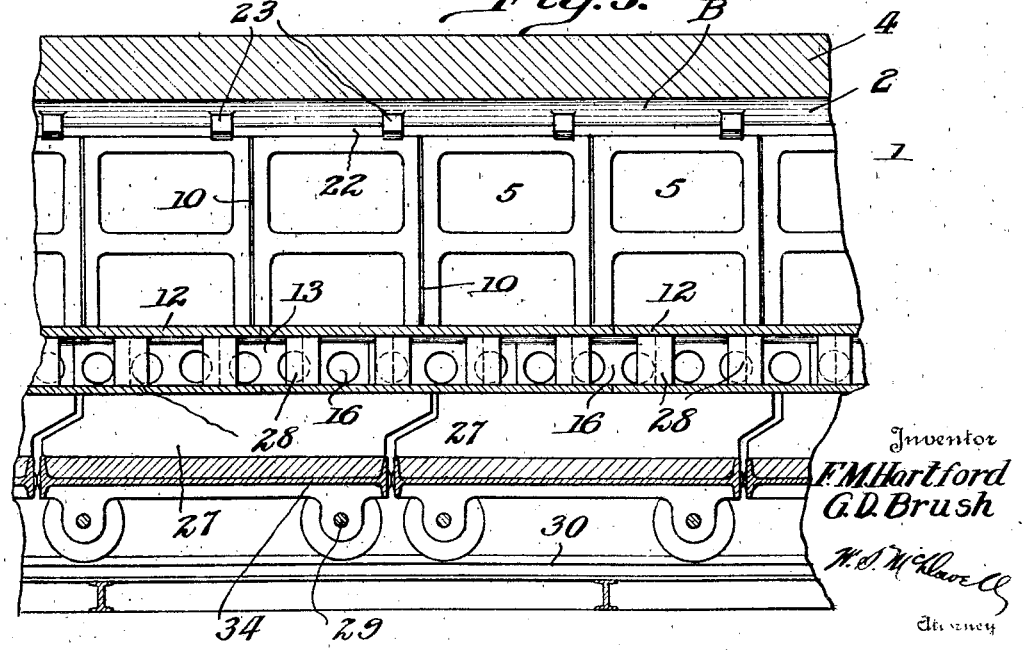
Fig. 5 is a vertical longitudinal sectional view.

Referring more particularly to the drawings, the numeral 1 designates the kiln comprising the present invention in its entirety. This kiln is formed to provide the usual elongated masonry wall structure fabricated to produce a longitudinally extending tunnel 2, coextensive with the length of the kiln. Generally, the kiln includes a preheating section, indicated at A, a high-fire section B and a cooling section C. These sections or zones are not separated by sharp lines of demarcation but merge gradually one into the other. The green or untreated ware or material enters the end of the kiln adjacent the preheating section and emerges at the end of the cooling section. The kiln is thus in the form of a tunnel, having side walls 3—3 and a flat or arched top 4. The material or ware to be treated passes through the tunnel on a suitable carrier and moves more or less continuously therethrough. The preheating section and the high fire section of the tunnel are, in the kiln illustrated, of greater width than the cooling section.

Starting in the high-fire section and continuing throughout that section and, also, through the preheating section to a position close to the charging end and on each side of the tunnel space required for the passage of ware, there is placed longitudinally aligned refractory plates in a vertical or substantially vertical position. Usually, the adjoining vertical edges of these plates will abut; although the joints formed therebetween need not necessarily be gas tight, in the sense that neither cement nor mortar need be used in joining the baffle plates one with another. These plates are indicated by the numeral 5 and are arranged on both sides of the ware tunnel to provide longitudinally extending combustion spaces 6 between said plates and the side walls 3 and the top 4 of the kiln. Highly heated gases, such as those obtained by the combustion of fuels, pass longitudinally through the spaces 6 thereby heating the plates 5 and causing the latter to radiate heat onto the ware passing through the tunnel. These high temperature gases or products of combustion are preferably introduced into the spaces 6 by means of burners 7. Heated air may be taken from the cooling section and introduced into the spaces 6, by way of the ports 8, shown in Fig. 6, to augment combustion in the spaces 6, such secondary air being preheated and may be obtained wholly or in part from the cooling section of the tunnel.

As the combustion gases travel towards the charging end of the kiln and the draft outlet 9, their rapid passage by the ends of the baffle plates 5, cause a rarefied pressure condition at the vertical joints 10 of said plates, as indicated in Fig. 3, on the combustion space side of the same, with the result that there is a tendency for the ware-tunnel atmosphere to be drawn through these joints into the combustion gas spaces, rather than allowing a leakage from such spaces out into the ware-tunnel. In this manner, and with the thought in mind that it may be desirable to maintain a more or less pure atmosphere in the ware-tunnel proper, it is quite evident that this condition will result, without use of special means, such as cement and mortar, to seal the joints between the adjoining portions of the baffle plates and adjacent members.

In addition to the main burner 7, the present invention employs a plurality of supplemental burners 11, ordinarily referred to as "pick-up" burners. These burners are employed to provide a small amount of heat underneath the car platforms 12, and this heat is so confined that the combustion gases can travel lengthwise through a car flue 13 or through the spaces 14 towards the charging or entrance end of the kiln and thence drawn out through damper regulated ports 15. Again, the products of combustion from these supplemental burners may pass entirely across the tunnel or flue 13, beneath the car platform, and enter one of the combustion spaces 6, formed by the baffle plates 5, by means of a plurality of ported blocks 16. These blocks are built in continuously at the location indicated in Fig. 2 in the wall structure throughout the length of the high-fire section B. It is to be understood that the supplemental or "pick-up" burners are entirely separate from the main burner system supplying the greater portion of the heat to the kiln and are separately or independently controlled. The blocks 16 continue from the end of the high-fire section and substantially entirely through the preheating section, but throughout the preheating section the blocks may be solid, that is, not perforated or provided with port openings. As stated, the baffle plates may be made of any refractory material and of any suitable cross sectional configuration, as shown in Figs. 2, 3, 4 and 6.

Inasmuch as a large part of the heat transfer to the ware may take place by radiation from the surfaces of the baffle plates and since there is always a tendency for heat to rise to upper levels in any enclosed space, it may become desirable to apply a coating of insulating material to the upper portions of these baffle plates, as indicated at 17 in Fig 7, or the plates may be thicker contiguous to their upper portions than at their lower portions. This coating or a wash of insulating material may be applied to the surface from which the heat is radiated onto the ware, and may be applied uniformly over, for example, the upper half or third of the height of a baffle plate or it may be graded in thickness from the top towards the bottom, being thickest at the top.

Again, for the reason that hot gases tend to rise to higher levels, even when traveling, it may be desirable to provide adjustable baffles, as shown at 18 in Fig. 2, which can be dropped through the crown or top of the kiln and into the upper portion of the combustion spaces 6 arranged in back of the baffles. Preferably, the longitudinal edges of the car platform 12 are provided with depending ribs 19 which are positioned in shallow sand containing troughs 20 formed in connection with the blocks 16. In some instances, the use of this additional sand seal may not be required but to prevent escape of combustion gases from the flue spaces 13 and 14 of the carriers, it should be used. When the sand seal is not used, the heat and products of combustion, developed by the supplemental burners 11, may rise upwardly into the ware tunnel proper and travel lengthwise towards the charging end of the kiln and be drawn out through the draft ports 15. However, the sand trough can be left in the blocks 16 and the car platforms can have the depending side edges 19, whether use is made of the sand seal or not. Preferably, the blocks 16 are provided with grooves 21, in which the lower edges of the baffle plates 5 are positioned. These baffle plates rest along their upper edges against support ledges 22 and are prevented from falling out towards the ware setting by the spaced blocks 23.

Another form of the invention, which has to do particularly with the baffling of the main portion of the products of combustion from the ware, is indicated in Fig. 4. In this form of kiln, the major portion of the combustion takes place not only along the sides of the ware setting, but also over the top of the same. In this case, the bottom "pick-up" or supplemental burners have the same advantage as in the case of the construction shown particularly in Fig. 2 in the manner of heating the bottom center portion of the ware setting. In Fig. 4, the vertical baffle plates engage at their upper edges with supports 24 projecting from the sides of the kiln and which also serve to position the arched top baffle plates 25 over the ware setting. By this construction, heat is radiated from the sides, top and bottom of the setting area so that a substantially uniform and equalized heating of such areas is obtained. Adjustable dampers 26 are utilized for controlling the opening and closing of the exhaust ports 15 at the charging end of the kiln for regulating the outflow of gases from the car flues 13 and 14, and in some instances from the ware tunnel itself. The dampers 26a are used to similarly regulate outflow of gases from the combustion spaces 6 along the sides of the kiln. The platforms 12 may be supported from the base or body 27 of each car by means of pier members 28. These members are provided with oppositely disposed bevelled surfaces arranged in vertical planes, and which face the supplemental burners to deflect combustion gases and minimize gas flow obstruction from said burners. The cars may be provided with the usual wheeled axles 29 operating over a trackway 30 extending longitudinally through the bottom of the tunnel, and the car sides may be formed with depending plates 31 which may be received within the customary sand troughs or seals 32.

From the foregoing, it will be seen that the present invention provides a tunnel kiln of the type which may be readily adapted to direct or indirect firing methods, that is, the high temperature combustion gases, employed in heating the kiln may or may not be passed through the kiln in indirect relationship to the ware undergoing treatment. If the indirect system of heating is used, the supplemental sand seal, indicated at 19 and 20, is employed to confine the gases passing through the passages 13 and 14 to the spaces existing between the car bodies and superposed platforms. Also, in the indirect method of firing, the baffle plates 5 have their contiguous edges placed immediately adjacent each other to confine the combustion gases to the spaces 6 and to prevent any substantial entry of such gases into the ware tunnel. Sufficient play is allowed between the meeting edges of the plates 5 to compensate for expansion and contraction of such plates due to temperature fluctuations and to thereby prevent injury or dislocations in the walls of the ware tunnel.

The supplemental burners 11 may be used in any desired number to maintain optimum temperatures in the car flues 13 and 14. It will be understood that the car bodies and platforms readily absorb heat and for this reason in an ordinary kiln the lower central portion of the ware setting is usually underheated as compared with the sides and upper portion thereof. However, by the provision of the flues 13, this condition is overcome and the ware is uniformly heated substantially throughout its mass. The baffle plates instead of being provided with plane surfaces may be corrugated as indicated at 33, in order to increase the surface area of such plates and their rate of heat liberation. The main burners used in supplying gases to the spaces 6 may be positioned angularly to direct gases inwardly and longitudinally into the spaces 6 toward the preheating section of the kiln and, if desired, the supplemental burners 11 on opposite sides of the kiln may be arranged in staggered relationship, as shown in Fig. 1. The metallic sills or beds 34 of the car frames, which support the bodies 27 composed of a refractory material, engage at their longitudinal ends, in order to absorb longitudinally applied forces directly and to relieve the refractory materials of strains other than those of mere weight.

The corrugations disclosed at 36 in the plate 5, as set forth in Figure 10, extend longitudinally and horizontally of the baffle plate in order to minimize turbulence in gas flow through the combustion spaces 6 adjacent to the plate. In Fig. 8 the corrugations have been shown as extending vertically of the plates 5 but it is believed that the horizontally extending corrugations are preferable for the reason specified. In certain instances these corrugations may be disposed to extend diagonally in a downward and angular direction, for the purpose of tending to conduct high temperature gases towards the bottom of the combustion gas spaces. As shown in Fig. 10 the corrugations found in the upper portion of the plate are of a very shallow and barely perceptible character, whereas the corrugations contiguous to the lower portion of the plate are of a deeper and more pronounced character. This provides more radiating surface adjacent to the lower portions of the plates to compensate for the relatively lowered temperatures existing in the bottom portions of the combustion spaces, as compared with the higher temperatures which obtain in the upper portions of said spaces, tending to equalize more uniformly and effectively the quantum of heat released into the ware tunnel by said plates throughout their height.

What is claimed is:

1. A heat radiating panel for tunnel kilns, comprising a flat, plate-like ceramic body of substantially rectangular configuration, reenforcing ribs integrally formed with the marginal portions of said body and additional laterally directed gas deflecting surfaces provided along one of the edges of said body of a length to overlap the adjacent edge of a complemental longitudinally aligned panel.

2. A heat radiating panel for tunnel kilns, comprising a flat, plate-like ceramic body of substantially rectangular configuration, reenforcing ribs integrally formed with the marginal portions of said body, and an additional laterally directed gas deflecting wing provided along one of the edges of said body, said body contiguous to said gas deflecting edge being provided with a recess for the reception of the edge portion of a complemental plate, whereby to permit said wing to overlap the joint formed between the meeting edges of adjoining aligned panels.

3. A heat radiating panel for tunnel kilns, comprising a flat, plate-like ceramic body of substantially rectangular configuration, reenforcing ribs integrally formed with the marginal portions of said body, and an additional lateral gas deflecting wing provided along one of the edges of said body, said body contiguous to said gas deflecting wing being provided with a recess for the reception of the wing overlapped edge portion of a complemental plate, the body portion of said plate being substantially corrugated.

4. In a kiln, a heat confining structure formed to include spaced side walls and a top wall, said side walls being inwardly offset contiguous to their lower portions, a plurality of longitudinally aligned heat radiating baffle plates having the lower edges thereof supported from the inwardly offset portions of the side walls, said plates being relatively spaced to provide a ware tunnel, said plates being further spaced from said side walls to define longitudinally extending combustion spaces, means for transporting ware longitudinally through said tunnel and out of direct contact with combustion gases passing through the combustion spaces, means for introducing combustible gases into said spaces, and supplemental means for introducing combustible gases into the lower portion of said kiln beneath said ware and out of direct contact with the ware on said supporting means.

5. In a kiln, a heat confining structure formed to include spaced side walls and a top wall, said side walls being inwardly offset contiguous to their lower portions, a plurality of longitudinally aligned heat radiating baffle plates having the lower edges thereof supported above the inwardly offset portions of the side walls, said plates being relatively spaced to provide a ware tunnel, said plates being further spaced from said side walls to define longitudinally extending combustion spaces, means for transporting ware longitudinally through said tunnel and out of direct contact with combustion gases passing through the combustion spaces, means for introducing combustible gases into said spaces, said spaces terminating contiguous to the ware inlet end of the kiln, supplemental means for introducing combustible gases into the lower portion of said kiln beneath and out of direct contact with the ware passing longitudinally therethrough, and damper controlled outlets for regulating efflux of combustion gases from said spaces.

6. In a kiln, a heat confining structure comprising spaced side walls and a top wall, said side walls contiguous to their lower portions being inwardly offset to present a pair of horizontal ledges, a plurality of longitudinally aligned baffle plates disposed in substantially vertical planes and having their lower edges received in holders provided in said ledges, guides formed in conjunction with the top wall to removably receive the upper edges of said plates, said plates being relatively spaced to provide a ware tunnel, carrier means movable longitudinally through said tunnel upon which the ware to be heat treated is supported, said plates being spaced from the side walls of said kiln to provide longitudinally extending combustion spaces, burner means arranged adjacent to one end of each of said combustion spaces for introducing high temperature combustion gases therein, damper controlled outlets for said combustion spaces situated contiguous to the ware inlet end of the kiln, and deflectors integral with the meeting edges of said baffle plates to confine said combustion gases to the combustion spaces.

7. In a tunnel kiln, a longitudinally extending masonry structure comprising spaced side walls and a top wall, said walls defining a longitudinally extending tunnel divided into preheating, high temperature and cooling sections, a plurality of longitudinally aligned substantially vertically disposed baffle plates stationarily mounted within said tunnel and spaced from the side walls of the latter to define combustion spaces on opposite sides of the tunnel, said combustion spaces being provided in the high temperature and preheating sections of said kiln, carrier means for passing ware longitudinally through the tunnel of said kiln between said baffle plates, burner means for introducing high temperature combustion gases into said spaces, said burner means being arranged to effect the passage of said combustion gases at all times longitudinally through said spaces in contra-direction to the passage of the ware through said tunnel, damper regulated outlets arranged contiguous to the charging end of the kiln for governing the efflux of combustion gases from said spaces, and inlet means admitting of the entrance of preheated air from said cooling section into said spaces for admixture with said combustion gases.

8. In a kiln, a wall structure formed to include spaced side walls and a top wall defining a longitudinally extending tunnel, said tunnel being formed to comprise preheating, high temperature and cooling sections, said cooling sections being of lesser width than the preheating and high temperature sections, carrier means for moving ware through said tunnel from end to end thereof, a plurality of stationary longitudinally aligned baffle plates positioned in the preheating and high temperature sections of said tunnel and arranged substantially in alignment with the side walls of the cooling section, said baffle plates being spaced from the side walls of the preheating and high temperature sections of said kiln to provide a plurality of combustion spaces substantially coextensive with the preheating and high temperature sections, burner means for introducing combustion gases into said spaces for longitudinal travel therethrough, means cooperative with the meeting edges of said baffle plates to confine said combustion gases to said spaces to substantially prevent their coming into contact with the ware travelling between said plates, and top baffle plates cooperative with the side baffle plates to overlie the ware passing through the preheating and high temperature sections of the tunnel.

9. In a kiln, a wall structure formed to comprise spaced side walls and a top wall, which define a longitudinally extending tunnel, said side walls being inwardly offset contiguous to their lower portions to produce horizontally extending ledges in a portion of the length of said tunnel, cars movable in the lower portion of said tunnel below said ledges, said cars being provided with refractory bodies, horizontally placed platforms supported by said bodies and arranged in a horizontal plane above said bodies, said platforms being adapted for the reception of the ware to be heat treated, a heat radiating wall supported from each of said ledges and spaced from said side walls to define longitudinally extending combustion spaces, means for introducing high temperature combustion gases into said spaces to effect the heating of said walls and the heating of the ware on said platforms, means for introducing combustion gases into said tunnel between said platforms and said car bodies and means cooperative with the longitudinal edges of said platforms to prevent said latter combustion gases from directly contacting with ware mounted on said car.

10. A kiln comprising a heat confining wall structure formed to include spaced side walls and a top wall, said walls defining a longitudinally extending tunnel, cars provided with refractory bodies movable longitudinally through said tunnel, ware supporting platforms carried by said car bodies in superposed relation with respect thereto, relatively thin heat transmitting walls spaced from the side walls of said tunnel and arranged stationarily on opposite sides of the ware supported on said platforms, said thin walls being spaced from the main side walls of said kiln to provide a plurality of combustion spaces, means for introducing high temperature combustion gases into said spaces, and additional means for introducing combustion gases into the spaces formed between said car bodies and said platforms and out of direct contact with ware on said platforms.

11. In a tunnel kiln, a heat confining wall structure formed to include spaced vertical side walls and a top wall, said walls defining a longitudinally extending tunnel passing through said kiln from one end thereof to the other, portable carriers movable longitudinally through said tunnel, platforms supported by and in supertunnel, posed relation with respect to said carriers, a plurality of ported blocks positioned on said side walls at each side of said carriers, burner means cooperative with said ported blocks for introducing combustion gases into the spaces formed between said carriers and said platforms, thin heat radiating walls positioned on said blocks and disposed on opposite sides of the ware setting arranged on said carriers, said thin walls being spaced from the main side walls of said kiln to provide a plurality of longitudinally extending combustion spaces, and means for introducing high temperature combustion gases into said combustion spaces for longitudinal travel therethrough.

12. In a tunnel kiln, a heat confining wall structure formed to include spaced vertical side walls and a top wall, said walls defining a longitudinally extending tunnel passing through said kiln from one end thereof to the other, portable carriers movable longitudinally through said tunnel, platforms supported by and in superposed relation with respect to said carriers, a plurality of ported blocks positioned on said side walls at each side of said carriers, burner means cooperative with said ported blocks for introducing combustion gases into the spaces formed between said carriers and said platforms, thin heat radiating walls positioned on said blocks and disposed on opposite sides of the ware setting arranged on said carriers, said thin walls being spaced from the main side walls of said kiln to provide a plurality of longitudinally extending combustion spaces, and means for introducing high temperature combustion gases into said combustion spaces for longitudinal travel therethrough, said ported blocks being provided along the upper surfaces thereof with holders arranged for the reception of the lower edges of said thin heat radiating walls.

13. In a tunnel kiln, a heat confining wall structure formed to include spaced vertical side walls and a top wall, said walls defining a longitudinally extending tunnel passing through said kiln from one end thereof to the other, portable carriers movable longitudinally through said tunnel, platforms supported by and in superposed relation with respect to said carriers, a plurality of ported blocks positioned on said side walls at each side of said carriers, burner means cooperative with said ported blocks for introducing combustion gases into the spaces formed between said carriers and said platforms, thin heat radiating walls positioned on said blocks and disposed on opposite sides of the ware setting arranged on said carriers, said thin walls being spaced from the main side walls of said kiln to provide a plurality of longitudinally extending combustion spaces, means for introducing high temperature combustion gases into said combustion spaces for longitudinal travel therethrough, said ported blocks being provided along the upper surfaces thereof with holders arranged for the reception of the lower edges of said thin heat radiating walls, said ported blocks being further provided with troughs adapted to contain sand, and depending ribs formed with the outer edges of said platforms and cooperative with said troughs to confine combustion gases to the space in said tunnel below said platforms.

14. As a new article of manufacture, a ceramic block for tunnel kilns having a longitudinally extending burner port formed therein, the upper surface of said block being provided with transversely disposed depressions, one of said depressions being of shallow trough-like form adapted for the reception of sand.

15. In a tunnel kiln, a heat confining structure formed to provide a longitudinally extending tunnel, cars movable through the lower portion of said tunnel and provided with refractory bodies, pier members arranged on said bodies, horizontal platforms supported by said pier members above said bodies, said tunnel being divided into preheating, high temperature and cooling sections, the preheating and high temperature sections of said tunnel being of greater width than the cooling section, relatively thin heat radiating walls spaced from the main side walls of said structure to provide a plurality of spaces for the passage of heated gases, burner means for introducing high temperature combustion gases into said spaces, said thin heat radiating walls being substantially coextensive with the preheating and high temperature sections of the tunnel, means for introducing combustion gases into the spaces formed between said car bodies and said platforms, and damper controlled outlets for withdrawing gases from said spaces.

16. In a tunnel kiln, a heat confining structure formed to provide a longitudinally extending tunnel, cars movable through the lower portion of said tunnel and provided with refractory bodies, pier members arranged on said bodies, horizontal platforms supported by said pier members above said bodies, said tunnel being divided into preheating, high temperature and cooling sections, the preheating and high temperature sections of said tunnel being of greater width than the cooling section, relatively thin heat radiating walls spaced from the main side walls of said structure to provide a plurality of spaces for the passage of heated gases, burner means for introducing high temperature combustion gases into said spaces, said thin heat radiating walls being substantially coextensive with the preheating and high temperature sections of the tunnel, supplemental burner means for introducing combustion gases into the spaces formed between said car bodies and said platforms, and damper controlled outlets for withdrawing gases selectively from said spaces, said pier members being provided with angular heat deflecting surfaces arranged to register with said supplemental burner means.

17. In a kiln, the combination of an elongated heat confining structure having side walls and a roof disposed relatively to form a tunnel, ware supporting means movable longitudinally through said tunnel, a plurality of longitudinally aligned heat-radiating baffle plates arranged in said tunnel on each side of said ware supporting means and spaced from the side walls of the tunnel to provide combustion spaces between said baffle plates and said side walls, burner devices for introducing high temperature gases into said combustion spaces for longitudinal travel therethrough, and adjustable means mounted in said combustion spaces for varying the effective area thereof at desired positions.

18. In a kiln, the combination of an elongated heat confining structure having side walls and a roof disposed relatively to form a tunnel, ware supporting means movable longitudinally through said tunnel, a plurality of longitudinally aligned heat-radiating baffle plates arranged in said tunnel on each side of said ware supporting means and spaced from the side walls of the tunnel to provide combustion spaces between said baffle plates and said side walls, burner devices for introducing high temperature gases into said combustion spaces for longitudinal travel therethrough, and vertically adjustable baffles mounted in said combustion spaces.

19. In a kiln, the combination of an elongated heat confining structure having side walls and a roof disposed relatively to form a tunnel, ware supporting means movable longitudinally through said tunnel, a plurality of longitudinally aligned heat-radiating baffle plates arranged in said tunnel on each side of said ware supporting means and spaced from the side walls of the tunnel to provide combustion spaces between said baffle plates and said side walls, burner devices for introducing high temperature gases into said combustion spaces for longitudinal travel therethrough, and vertically adjustable baffles extending through the roof of said kiln and operative to control the effective area of said combustion spaces where desired.

20. In a kiln, a heat confining wall structure formed to provide spaced side walls and a top providing a longitudinally extending tunnel, ware supporting means movable longitudinally through said tunnel, removable longitudinally aligned baffle plates supported by said wall structure on each side of said ware supporting means, said plates being spaced from said side walls to provide longitudinally extending combustion gas spaces between said plates and side walls, said plates being provided with substantially longitudinally extending corrugations, the ribs of said corrugations extending parallel with the paths of gas travel through said combustion spaces, and means for introducing combustible gases into said spaces.

21. In a tunnel kiln, a heat confining wall structure formed to include spaced vertical side walls and a top wall, said walls defining a longitudinally extending tunnel passing through said kiln from one end thereof to the other, cars movable in train formation longitudinally through said tunnel, platforms supported by said cars above the bodies of the latter, a plurality of horizontally disposed burners passing through the side walls of said kiln for introducing combustion gases into said tunnel below said platforms, sealing means cooperative with the outer longitudinal edges of said platforms for preventing direct contact of said combustion gases with ware arranged on said platform, and an enclosure supported by the side walls of said tunnel and consisting of a plurality of heat radiating panels arranged to surround the ware mounted on said platforms and spaced from the side and top walls of said kiln to provide spaces for the circulation of said combustion gases around the sides and top of the ware disposed on said platforms, said panels serving to prevent direct contact of said combustion gases with said ware.

22. In a tunnel kiln, a heat confining wall structure comprising spaced vertical side walls and a top wall, said walls defining a longitudinally extending tunnel passing through said kiln from one end thereof to the other, cars movable in train formation longitudinally through said tunnel and provided with refractory horizontally aligned bodies, relatively thin heat transmitting platforms supported by said cars above the bodies of the latter, said platforms being adapted for the reception of the ware to be heat treated by passage through said tunnel, a plurality of horizontally disposed burners for introducing combustion gases into said tunnel below said platforms to heat the ware disposed on the platforms, and sealing means cooperative with the outer longitudinal edges of said platforms for preventing direct contact of said combustion gases with ware arranged on said platforms.

23. In a tunnel kiln, a heat confining wall structure formed to include spaced vertical side walls and a top wall, said walls defining a longitudinally extending tunnel passing through said kiln from one end thereof to the other, cars movable in train formation longitudinally through said tunnel, each of said cars being provided with a body of refractory material, relatively thin heat transmitting ware supporting plates supported by said cars above the bodies of the latter, a plurality of horizontally disposed burners arranged to introduce combustion gases into said tunnel below said plates and above the car bodies, sealing means cooperative with the outer longitudinal edges of said plates for preventing direct contact of said combustion gases with ware arranged on the plates, and an enclosure supported by the side walls of said tunnel and comprising a plurality of heat radiating panels arranged at the sides of the ware supported on said plates to provide spaces for the passage of combustion gases along the sides of the ware and out of direct contact therewith.

24. In a tunnel kiln, a refractory wall structure formed to include spaced side and top walls arranged to provide a longitudinally disposed tunnel, cars movable longitudinally through said tunnel for the support of ware to be heat treated thereon, a plurality of stationary longitudinally aligned heat transmitting plates positioned in said tunnel on opposite sides of the ware disposed on said cars, said plates being spaced from the side walls of the kiln to provide longitudinally extending combustion spaces between said side walls and said plates, burner means for introducing combustible gases into said spaces for longitudinal travel therethrough, the vertical edges of said plates terminating in overlying relationship, and deflectors formed in conjunction with the overlapping meeting edges of said plates and operative upon the passage of combustion gases through said spaces to produce suction forces tending to draw the atmosphere in the ware receiving portions of the tunnel into said spaces.

25. The structure as set forth in claim 24 wherein the deflectors are integrally formed with the overlapping meeting edges of the heat transmitting plates.

FRANK M. HARTFORD.
GEORGE D. BRUSH.